Jan. 6, 1959

W. MANDLER 2,867,151

TELESCOPIC SIGHT

Filed March 22, 1957

INVENTOR.
WALTER MANDLER
BY
Toulmin & Toulmin
Attorneys

United States Patent Office 2,867,151
Patented Jan. 6, 1959

2,867,151

TELESCOPIC SIGHT

Walter Mandler, Midland, Ontario, Canada, assignor to Ernst Leitz Canada Limited, Midland, Ontario, Canada Application March 22, 1957, Serial No. 647,807

Claims priority, application Germany March 22, 1956

9 Claims. (Cl. 88—32)

The present invention relates to a telescopic sight, more particularly, to a reflecting sight which is short in length and simple in construction, but capable of providing an intermediate image of the target, in which a reticule will be located.

It is the principal object of this invention to provide a simplified and improved unit-power telescopic sight for rifles, guns, and the like, but which may also be used as a viewer or range finder for cameras.

It is another object of this invention to provide a telescopic sight wherein the optical members are rigidly secured so that they will not become loose or vary their relative portion to each other even after long periods of hard use.

It is a further object of this invention to provide a telescopic sight, the accuracy of which is not impaired either by the firing of the gun or by recoil action thereof.

It is an additional object of this invention to provide a telescopic sight wherein all of the optical members are rigidly secured together to form an integral unit.

It is still a further object of this invention to provide a telescopic sight having a real intermediate image at the reticule which is on a plane surface.

Other objects and advantages of this invention will become apparent upon reference to the accompanying descriptions when taken in conjunction with the following drawings wherein.

The present invention initially comprises a unit-power telescopic sight wherein the objective and the ocular and the reversal system are provided in the form of two concave reflecting surfaces which face each other. Two plain mirrors are also provided to coact with the concave reflecting surfaces to form the reversal system. The objective and the first reflecting surface of the reversal system are parts of the same concave surface. Also the second reversal reflecting surface and the ocular are parts of a second concave reflecting surface.

Figure 1:
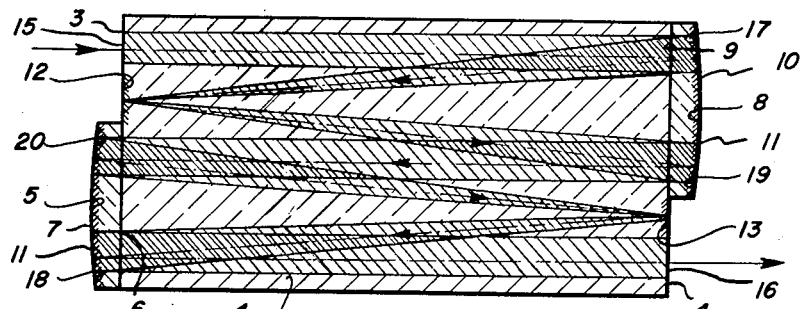
Figure 1 is a side elevational view of the telescopic sight of this invention.

Returning now to the drawings, more particularly to Figure 1, wherein like symbols indicate the same parts throughout the various views, 1 indicates generally the telescopic sight of this invention which comprises a prism 2 formed of a light transmitting material such as glass. The prism 2 has a rectangular cross section, as may be more clearly seen in Figure 2, and opposed parallel end surfaces 3 and 4.

A plano-convex lens 5, which is elongated in shape and having a plane surface 6 and a convex surface 7, is secured to the end surface 3 and covers a portion thereof. A second plano-convex lens 8, which is elongated in shape and which has a plane surface 9 and a convex surface 10, is secured to the end surface 4 and also covers a portion thereof. The lenses 5 and 8 are so positioned that the major or central axes thereof are spaced from each other but are in parallel relationship. Also the lenses as they are mounted on the end surface of the prism have portions thereof which face each other or may be said to be in overlapping relationship. Each of the lenses 5 and 8 has a reflecting surface 11 on the respective convex surfaces 7 and 10 thereof. Reflecting surface 11 comprises a metallic coating and forms a concave reflecting surface.

Figure 2:
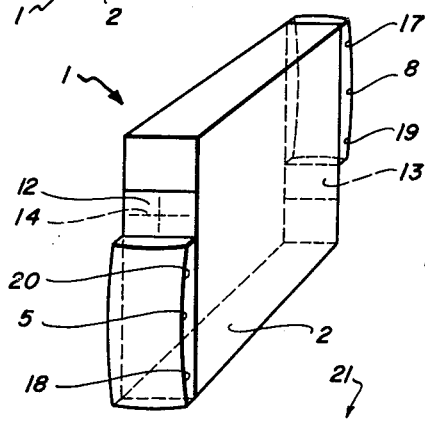
Figure 2 is an over-all perspective view of the telescopic sight shown in Figure 1 and looking from one end thereof.

A plane reflecting surface or mirror 12 is secured to the prism end surface 3 adjacent the overlapping portion of the lens 5. The plane mirror 12 covers an additional portion of the end surface 3 and is located in the plane of the plane surface 6 of the lens 5. A second plane mirror 13 is similarly secured on the other prism end surface 4. A reticule 14 which is illustrated in Figure 2 is mounted on the plane mirror 12.

The prism end surfaces 3 and 4 have uncovered portions 15 and 16, respectively, which function respectively to admit light rays into the telescopic sight and as a point of emergence of the light rays from the sight. The portion of the lens 8 indicated at 17 which is opposite the uncovered portion 15 of the prism and surface 3 is the objective of the telescopic sight. The portion of the lens 5 indicated at 18, which is opposite the point of emergence 16, is the ocular of the sight. The entire sight comprising the prism 2 and the lenses 5 and 8 may be coated with a dark material or covered with an opaque housing with the exception of round inlet and exit openings at 15 and 16 respectively.

In operation light rays are admitted to the sight at 15 of the prism and are subsequently received upon the objective 17, which produces a reversal and forms an inverted real image on the plane mirror 12. This image is reflected back to a reversal mirror 19, which is a portion of the convex surface of the lens 8. The light rays are then reflected to a second reversal mirror 20, which is a portion of the concave surface of the lens 5. The rays are then reflected to the plane mirror 13 from which they are reflected to the ocular 18 and then outwardly of the telescopic sight at the point 16. The image seen at 16 is not magnified over the image received at 15. Thus no magnification is present in this sight and the sight is a unit-power telescope.

Figure 3:
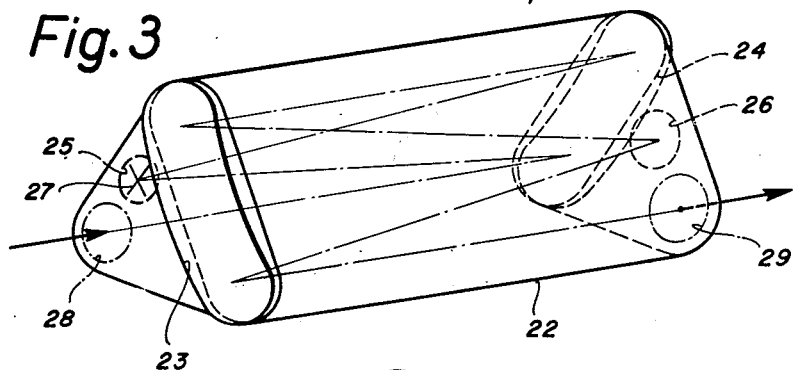
Figure 3 is an over-all perspective view of a modification of the telescopic sight of this invention.
Figure 4:
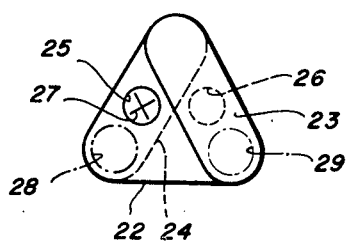
Figure 4 is an end elevation view of the modified sight illustrated in Figure 3.

Proceeding next to Figures 3 and 4, there is illustrated at 21 a modification of the telescopic sight of this invention. The modified sight 21 comprises a prism 22 of light transmitting material and has a triangular cross section as may be better seen in Figure 4. The optical components of the modified sight are the same as described in connection with the sight of Figures 1 and 2. These components comprise plano-convex lenses 23 and 24, which have an elongated shape as may be seen in Figure 3 and are positioned on the opposed end surfaces of the prism 22. The lenses 23 and 24 form an angle of 60° and portions thereof overlap each other as illustrated in Figure 4.

There are plane mirrors 25 and 26 on each of the end surfaces of the prism 22 with the plane mirror 25 having a reticule 27 thereon. A portion of the end surface indicated at 28 functions as the point of admission of the light rays and a portion of the opposed end surface 29 serves as the point of emergence of light rays from the sight.

The modified sight embodies the same principles of the sight illustrated in Figures 1 and 2 and functions in the same manner. A portion of the lens 24 is the objective and a portion of the lens 23 is the ocular of the modified sight. Again real images are formed on each of the plane mirrors 25 and 26.

Thus it can be seen that the present invention provides with very few simple components an effective sight. The sight is extremely sturdy since all of the optical components are secured eogether to form an integral unit or arrangement. As a result the optical members are not subject to displacement due to any shocks or sudden force exerted against the sight.

It will be understood that this invention is susceptible to modification in order to adapt it to different usages and conditions, and, accordingly, it is desired to comprehend such modifications within this invention as may fall within the scope of the appended claims.

It is claimed:

1. A unit-power telescope sight, comprising, in combination two concave mirrors, portions of which face each other, a part of one of said concave mirrors forming the objective and producing an inverted real image while at least part of the other concave mirror forms the ocular of the sight, optical means for reversing said inverted image to produce an upright real image, two plane mirrors each of which is arranged in the plane of one of said images, and a reticule disposed on one of said plane mirrors.

2. A unit-power telescope sight, comprising, in combination, two concave mirrors portions of which face each other, at least part of one of said concave mirrors forming the objective and producing an inverted real image, at least part of the other concave mirror forms the ocular of the sight, a reversing system for reversing said inverted image to produce an upright real image which reversing system comprises first and second concave mirrors, two plane mirrors each of which is arranged in the plane of one of said images, and a reticule disposed on one of said plane mirrors.

3. A unit-power telescope sight comprising, in combination, two concave mirrors portions of which face each other, at least part of one of said concave mirrors forming the objective and producing an inverted real image, at least part of the other concave mirror forming the ocular of the sight, a reversing system for reversing said inverted image to produce an upright real image, which reversing system comprises first and second concave mirrors, two plane mirrors each of which is arranged in the plane of one of said images, said first concave mirror in the reversing system and said objective being different parts of a single concave surface, and said second concave mirror and said ocular being different parts of another single concave surface, and a reticule disposed on one of said plane mirrors.

4. An optical system for use as a unit-power telescopic sight and comprising a prism of light transmitting material having two parallel planar end surfaces opposite each other, a first lens body having a planar and a convex surface and being rigidly attached with its plane surface to one of said prism end surfaces and covering part thereof, a second lens body having a planar and a convex surface and being rigidly attached with its planar surface to the other prism end surface and having its central axis out of alignment with the central axis of said first lens body, a first and a second light reflecting layer covering said convex surfaces of said first and second lens bodies, respectively, so as to convert the same into a first and second concave mirror, a first planar mirror attached to and covering part of that portion of the prism end surface which is free from said second lens body, a second planar mirror attached to and covering part of that portion of the other prism end surface which is free from said first lens body, and a reticule arranged on one of said plane mirrors, the portions of said prism end surfaces free from said lens bodies and said plane mirrors serving as entrance and exit, respectively, for light rays, part of said first concave mirror acting as the objective of the optical system, and adapted for producing a real inverted image on said first plane mirror, part of said second concave mirror acting as the ocular of the optical system, the remaining parts of said first and second concave mirrors forming an optical reversing system.

5. In an optical system for use as a unit-power telescopic sight as claimed in claim 4 wherein said prism has a rectangular cross section.

6. In an optical system for use as a unit-power telescopic sight as claimed in claim 4 wherein said prism has a triangular cross section.

7. In an optical system for a unit-power telescopic sight or the like, two spaced concave reflecting lenses with the major axes thereof being offset from each other but in parallel relationship, portions of said concave lenses overlapping each other, plane reflecting surfaces at the overlapping edges of each of said concave lens to reverse direction of light rays reflecting from said concave lens, and a reticule on one of said plane reflecting surfaces.

8. A unit-power telescopic sight comprising a prism of light transmitting material having parallel opposed planar end surfaces, a first plano-convex lens with said planar face secured to a portion of one of said end surfaces of said prism, a second plano-convex lens with its planar face secured to a portion of the other end surface of said prism, parts of said covered end surfaces overlapping each other, a light reflecting substance on each of the convex surfaces of said lens to form concave reflection surfaces, a plane reflecting surface on each of the uncovered portions of said prism end surfaces, and a reticule on one of said plane reflecting surfaces, the remaining uncovered portion of one of said prism end surfaces admitting light rays to the sight and the remaining uncovered portion of the other end surface being the point of emergence of light rays from said sight.

9. In an optical system for a unit-power telescopic sight and the like, two spaced concave reflecting lenses with the major axes thereof parallel and portions of said lenses overlapping each other, a portion of one of said concave lenses forming the objective and a portion of the other concave lens forming the ocular, a first plane reflecting surface adjacent the edge of the overlapping portion of the other concave lens and reflecting the inverted real image produced by said objective against the overlapping portion of said one concave lens, a second plane reflecting surface adjacent the overlapping portion of said one concave lens to reflect the image from the overlapping portion of said other concave lens to said ocular, and a reticule on one of said plane reflecting surfaces.

References Cited in the file of this patent

UNITED STATES PATENTS 1,525,658     Roach _____ Feb. 10, 1925

FOREIGN PATENTS 16,088     Austria _____ May 10, 1904